(12) United States Patent
Deinlein

(10) Patent No.: US 10,137,349 B2
(45) Date of Patent: Nov. 27, 2018

(54) GOLF TRAINING AID

(71) Applicant: Marcus Deinlein, Essex, MD (US)

(72) Inventor: Marcus Deinlein, Essex, MD (US)

( * ) Notice: Subject to any disclaimer, the term of this patent is extended or adjusted under 35 U.S.C. 154(b) by 0 days.

(21) Appl. No.: 15/644,243

(22) Filed: Jul. 7, 2017

(65) Prior Publication Data

US 2018/0008876 A1   Jan. 11, 2018

Related U.S. Application Data

(60) Provisional application No. 62/360,526, filed on Jul. 11, 2016.

(51) Int. Cl.
*A63B 69/36*  (2006.01)
*G09B 19/00*  (2006.01)

(52) U.S. Cl.
CPC ...... *A63B 69/3608* (2013.01); *A63B 69/3641* (2013.01); *G09B 19/0038* (2013.01); *A63B 2209/10* (2013.01); *A63B 2225/09* (2013.01)

(58) Field of Classification Search
USPC ............ 473/212, 214, 215, 217, 226, 227
See application file for complete search history.

(56) References Cited

U.S. PATENT DOCUMENTS

| | | | | |
|---|---|---|---|---|
| 1,618,273 A * | 2/1927 | Davidson | ............ | A63B 21/0004 482/124 |
| 3,069,169 A * | 12/1962 | Topping | ............. | A63B 69/0059 473/212 |
| 5,158,510 A * | 10/1992 | Lemire | ............. | A63B 21/4001 482/51 |
| 5,188,365 A * | 2/1993 | Picard | ............... | A63B 69/0059 473/212 |
| 5,295,690 A * | 3/1994 | Johnson | ............. | A63B 69/0059 434/252 |
| 5,813,955 A * | 9/1998 | Gutkowski | ........ | A63B 21/0004 482/121 |
| 5,937,122 A * | 8/1999 | Ohki | .................... | G02B 6/3818 385/139 |
| 6,095,936 A * | 8/2000 | Kirkpatrick | ........ | A63B 69/0071 434/248 |
| 6,551,221 B1 * | 4/2003 | Marco | ................ | A63B 21/0004 280/600 |
| 6,755,755 B2 * | 6/2004 | Wah Loh | ........... | A63B 69/0059 119/770 |
| D518,535 S * | 4/2006 | Haskell | ........................ | D21/662 |
| 7,150,248 B2 * | 12/2006 | Hodl | ..................... | A01K 15/02 119/818 |
| 7,314,437 B2 * | 1/2008 | Frappier | .......... | A63B 21/00065 482/124 |

(Continued)

*Primary Examiner* — Nini Legesse
(74) *Attorney, Agent, or Firm* — Andrew Morabito

(57) ABSTRACT

A golf training aid comprising a flexible arm band adapted to releasably fasten, a flexible strip having a first end and a second end and at the first end and the second end a closed loop is formed, wherein at substantially the midpoint of the flexible strip is attached to the flexible arm band, a first band detachably attached to the flexible strip through the closed loop at the first end, a second band is detachably attached to the flexible strip through the closed loop at the second end, and a securing mechanism attached to the second end of the first band and the second end of the second end by the detachable connects, and the securing mechanism is designed to secure to a golfer's clothing.

13 Claims, 5 Drawing Sheets

(56) References Cited

U.S. PATENT DOCUMENTS

| | | | |
|---|---|---|---|
| 7,608,026 B1 * | 10/2009 | Nicassio | A63B 21/00185 24/265 BC |
| 7,758,436 B2 * | 7/2010 | Reynolds | A63B 69/0057 473/207 |
| 2012/0283077 A1 * | 11/2012 | Cranke | A63B 21/0442 482/124 |

* cited by examiner

GOLF TRAINING AID

BACKGROUND

The present invention relates generally to the field of golf training aids, and more particularly to a device to adjust deficiencies in their swing.

Golf is a highly popular worldwide activity for persons of all ages and levels of skill. The objective in golf is to get the ball in the hole in as few shots as possible. Hitting the golf ball with power and accuracy can help achieve this objective. A golfer hitting the golf ball with a fundamentally desired swing can ensure that the ball is hit with power and accuracy more consistently. In a fundamentally desired swing, the golfer's body and the golf club can be in positions at appropriate times or in the proper sequence during the swing to help the golfer hit the ball efficiently. When done properly, the swing can look fluid and natural.

Getting into fundamentally sound positions during the swing can often feel awkward and unnatural for the average golfer. The average golfer may proceed to swing in a way that is comfortable, and fundamentally less than ideal, and hit the ball poorly because of it. This can lead to frustration and bad scores, which can be avoided by improving the swing.

Many golfers unconsciously break from proper form during their swing, whether their arms drift away from their body or their elbows splay out. This can particularly happen at the top of a swing. Because this motion can be done unconsciously, it can be difficult to correct. While golfers can intentionally practice their swing to remove these undesired motions, without some aid it is likely that their muscles may automatically revert to their faulty swing. Unfortunately, improper form can dramatically slow down a golfer's form, causing them to lose power.

Golf instruction can be based on the golfer learning by feel. In this method, the golfer feels the proper way to swing the golf club rather than being told the proper body and golf club positions or what the proper swing should look like. In one approach, some instructors ask golfers to hold a position in their swing (such as the top of the backswing), then physically modify that position so the golfer can feel the difference between the fundamental sound modified position, and the previous fundamentally unsound position. This approach does not allow the golfer to hit the golf ball in one fluid motion. So, although the golfer gets the feeling of what the correct position is, the golfer does not necessary know what that position feels like during the fluid and constantly moving swing.

Timing and the kinetic sequence is another aspect of the swing. Kinematic sequencing refers to matching up the lower body motion in the swing with the upper body motion through the back swing and down swing into the ball. Some may believe that proper kinematic sequence may occur when the upper body and lower body move in a complementary manner that is most efficient in producing power and accuracy. Improper kinematic sequence during the transition of the swing can lead to a flawed swing. The transition of the swing may be considered the point during a swing when the club begins to change directions from the top of the backswing back towards the golf ball. When a golfer's kinematic sequence is off during the transition, one of two things might happen: the golfer's upper body might initiate the transition, leading to the common "over-the-top" flaw, or the golfer's lower body might move too fast and dominate the upper body move, leading to another common flaw where the golfer is "stuck."

Thus, the present invention provides a golf training aid for improving the swing of all level golfers and helping warm up or stretch out the golfer.

SUMMARY

According to one aspect the present invention is a golf training aid comprising a flexible arm band adapted to releasably fasten, a flexible strip having a first end and a second end and at the first end and the second end a closed loop is formed, wherein at substantially the midpoint of the flexible strip is attached to the flexible arm band, a first band, having a first end and a second end wherein a detachable connector is secured to the first end and the second end, wherein the detachable connector at the first end of the first band is detachably attached to the flexible strip through the closed loop at the first end, a second band, having a first end and a second end wherein a detachable connector is secured to the first end and the second end, wherein the detachable connector at the first end of the second band is detachably attached to the flexible strip through the closed loop at the second end, and a securing mechanism attached to the second end of the first band and the second end of the second end by the detachable connects, and the securing mechanism is designed to secure to a golfer's clothing.

DETAILED DESCRIPTION

Figure 1:
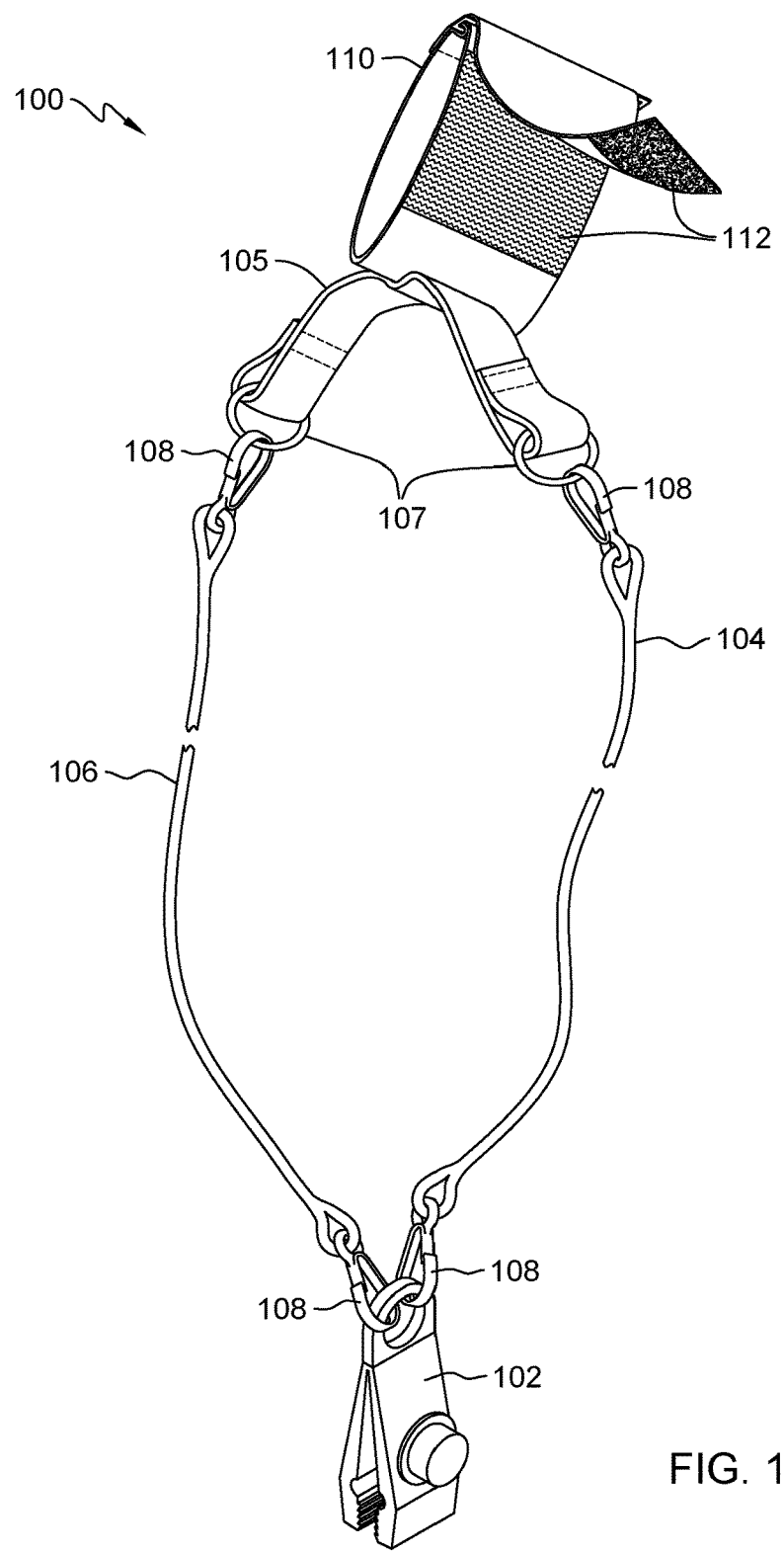
FIG. 1 depicts an isometric view of the golf training aid, in accordance with one embodiment of the present invention.

The present invention relates to a golf training aid which allows a golfer to feel the correct swing form. Through use of the aid, golfers are able to practice swinging in the desired form, and through continued use of the aid the golfer can develop the correct swing form. The device assists in maintaining a relationship between the arm and opposing hip of the golfer. Through the repeated use of the aid, the golfer established the desired motions to muscle memory and replicate these motions and movements when playing golf without the aid. It is difficult for golfers to overcome the natural tendencies and subconscious to revert to their natural movements. The device forces the golfer to follow the desired swing pattern and after using the aid, the golfer is able to remove the natural tendencies and subconscious and maintain a desired swing pattern and form. Without the device, the golfer will not have active notice of what portions of their natural swing are/is incorrect, and will continue to swing the golf club incorrectly. This device also allows the golfer to practice the ideal swing at full speed to give a more natural adjustment to their swing.

Among golfers is a tendency to raise their elbow on their backswing. This happens when the golfer right arm loses connection with the body and begins to travel away from the body. A right-handed golfer's right arm is significantly bent and in a weak position to hit the ball. This leads to a weak and inaccurate golf swing. In various embodiments, the golf training aid described herein may help fix this problem because as the golfer swings the club back, the golf training aid pulls the golfer's arm down towards their body keeping their arm in the proper position due to resistance of the golf training aid. If the golfer does try to raise their elbow, the golf training aid provides a counter force against the golfer. Because of this, the golfer naturally keeps their arm down in their backswing. The feeling the golfer gets while doing this is exactly the feeling they needs to have to correct this issue. The golfer can then practice and learn the feeling of providing force against the resilient connector by practicing with the training aid. After the feeling is engrained and the golfer removes the golf training aid, the golfer may continue to provide the learned counter force to fix the problem.

The device is small enough to wear under a jacket and is not noticeable due to its small size and minimal components. Thereby allowing a shy golfer to use the aid in public without the threat of embarrassment.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may also be used in the practice or testing of the present invention, the preferred methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

FIG. 1 depicts an isometric view of the golf training aid 100, in accordance with one embodiment of the present invention. The golf training aid 100 is comprised of a belt connector 102, a first band 104, a second band 106, a plurality of connectors 108, an extension strip 105, and an arm band 110.

The arm band 110 forms a cuff that is secured around the golfer's forearm, elbow, or upper arm. The arm band 110 has a fastening device 112 that is used to secure the arm band 110 to the golfer. The arm band 110 may be made from, an elastic material such as neoprene, spandex, lycra, elastane, polyester, nylon, or the like. The arm band 110 has a predetermined thickness. In one embodiment, the arm band 110 is ten (10) inches long and four (4) inches wide. The fastening device 112 secures the arm band 110 to the golfer, so that when the golfer is swinging, the band does not move, shift, or become detached from the golfer. The fastening device 112 may be various fastening devices such as hook and loop style fasteners, clasps, buckles, latches, buttons, hooks and loops, or the like.

The extension strip 105 is attached to the arm band 110 opposite where the fastening device 112 of the arm band 110 is located. The extension strip 105 is designed to distance the connectors 108 from the golfer so that they do not rub against the golfer's body, providing a more comfortable experience. In the depicted embodiment, the extension strip 105 is thinner than the arm band 110. Various sizes of the extension strip 105 are possible. The extension strip is of a predetermined length, and may vary based on the size and height of the golfer. The material of the extension strip 105 may be the same as the arm band 110 or various flexible materials. The extension strip 105 is attached to the arm band 110 at approximately the center of the extension strip 105 so that substantially equal lengths of material extend outward. In the depicted embodiment at the end of each strip is a closed loop and a ring 107 for the connector 108 to attached to. In additional embodiments, the ends of the extension strip 105 may have openings or apertures for the connectors 108 to connect to, or various other means known to those skilled in the art.

The connectors 108 attached the bands 104 and 106 to the extension strip 105 via the rings 107, and also connect to the belt connector 102. In the depicted embodiment, the connectors 108 are permanently secured to the bands 104 and 106. In various embodiments, the connectors 108 may be detachable from the bands 104 and 106. In the depicted embodiment, the connectors 108 are clips that are detachable. In various other embodiments, other detachable clips, clamps, clasps, or detachable fastening means may be employed by the connectors 108. In some embodiments, the bands 104 and/or 106 are secured directly to the extension strip 105.

The bands 104 and 106 are used to create during various parts of the golfer's swing to assist the golfer in improving the kinematic sequence and strength of the golfer's swing. The bands 104 and 106 are designed to restrict the golfer's movement through various stages of their swing. The length of the bands 104 and 106 is a predetermined length and bands 104 and 106 may not be substantially the same size. The length may differ based on the golfer's height, arm length, waist, and other physical characteristics of the golfer. The length may also be based on the golfer's swing and the desired correction. In one embodiment, the bands 104 and/or 106 are made from a rigid or inflexible material. In additional embodiments, the bands 104 and/or 106 may be made from an elastic flexible material such as neoprene, spandex, lycra, elastane, polyester, nylon, rubber, latex, or the like that produce precise elasticity. In yet additional embodiments, the bands 104 and/or 106 may be made from different elastic materials. In some embodiments, the bands 104 and/or 106 have the ability to adjust the length, so that the golfer can adjust the desired effect quickly. The bands 104 and/or 106 are adjusted with the additional of a cord lock, buckle, or a slide. The adjustability of the band(s) allow for use of the aid by golfers of varying sizes, and also allows for a more customizable experience with the aid. In additional embodiments, the bands 104 and/or 106 may be retractable through the use of a housing and the band is coiled up and a spring mechanism which gains tension when the band is withdrawn from the housing.

In some embodiments, the bands 104 and/or 106 have an adjustable tension settings mechanism to allow for various tension settings on the bands to assist in curing various different issues. This can be in the form of the adjustable tension settings mechanism that shortens the bands 104 and/or 106. In another embodiment, the adjustable tension setting mechanism may have be integrated with the bands 104 and/or 106 to increase the elasticity or decrease the elasticity.

A benefit of the detachable ability of the bands 104 and/or 106 is for the height and/or size of the golfer, to replace worn or damaged bands or connectors, or to further customize the desired swing of each individual golfer.

The belt connector 102 attaches the golf training aid 100 to the golfer's belt, pants, or hip. This secures the golf training aid 100 in place to create a constant effect of the golf training aid 100 on while the golfer is practicing. In the depicted embodiment, the belt clip 102 is an adjustable clip that is secured to the golfer's pants, and is secured to the bands 104 and 106 by a set of connectors 108. In additional embodiments, the belt connectors 102 may be a band that is secured around the golfer's waist with an attached point for the connectors 102 to attached to, and may be a similar design to the arm band 110. In some embodiments, bands 104 and/or 106 are directly secured to the belt connectors 102. The belt connector 102 is designed to be releasably attached to the golfer's pants, belt, or a waist band. Various connectors, clips, clasps, hook, latches, fasteners, buckles, recloseable fasteners, or hoop and loop style fasteners.

In additional embodiments, more bands may be incorporated to further assist with controlling the swing of the golfer.

In additional embodiments, a waist band may be secured to the golfer's waist with the belt connector 102 affixed to the waist band. This would assist to further control the golfer's upper body during the swing.

In additional embodiments, the resistance or tension of the bands 104 and 106 may be customizable by an integrated system that incorporates an adjustment knob or dial attached to the arm band 110 or the connector 102 that when adjusted modifies the tension of the band(s) accordingly. This will remove the necessity to have various bands to achieve various tension settings.

In yet additional embodiments, the bands 104 and 106 are replaced by a single band that passes through the rings 107 and the belt connector 102.

Figure 2:
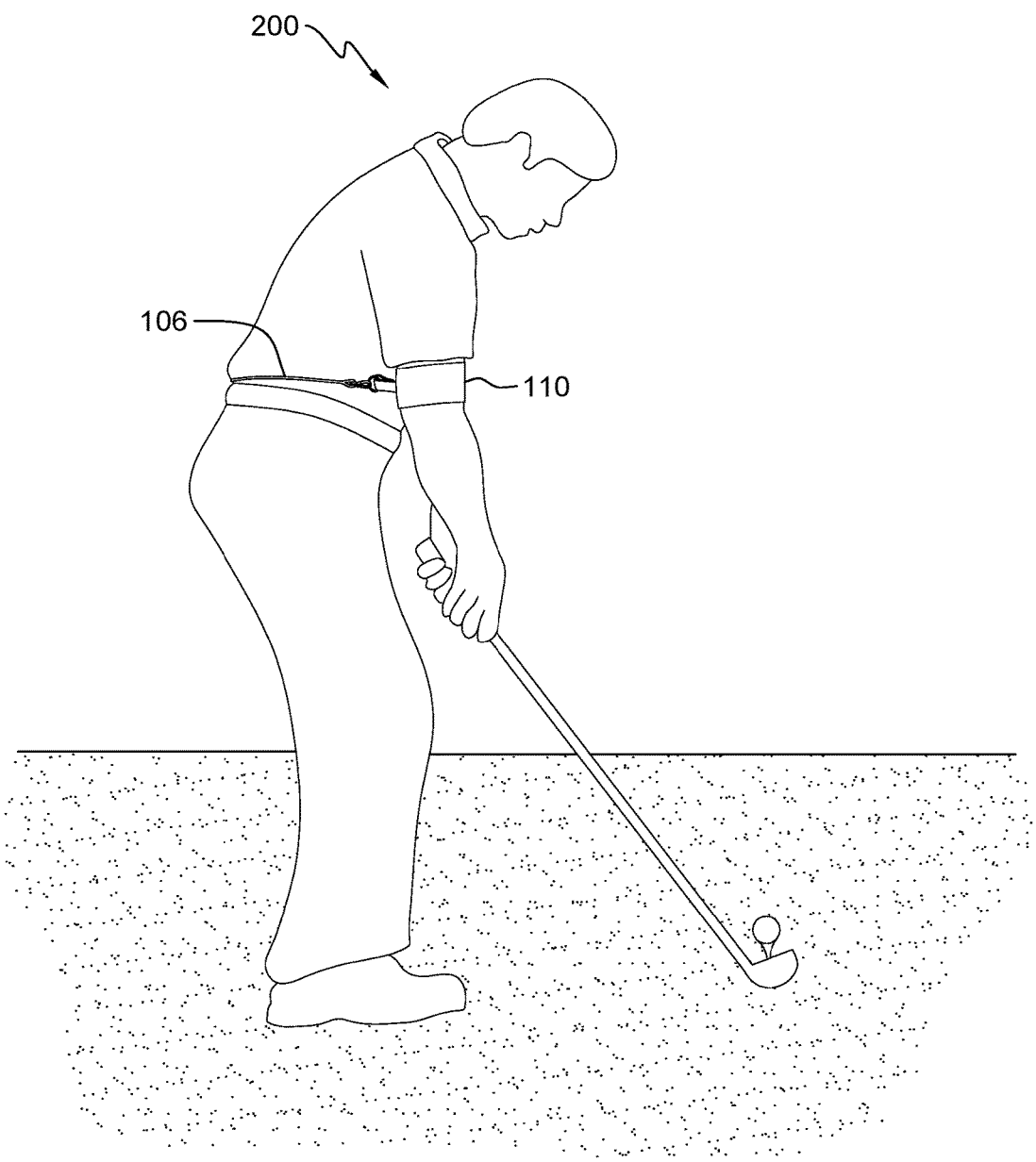
FIG. 2 depicts a front view of a golfer wearing the golf training aid, in accordance with an embodiment of the present invention.

FIG. 2 depicts a rear view of a golfer 200 wearing the golf training aid 100, in accordance with an embodiment of the present invention. In the depicted embodiment, the arm band 110 is shown attached to the golfer's 200 right arm above the elbow, and the second band 106 is shown extending around the back of the golfer 200. The golf training aid 100 is shown forcing the golfer's 200 right arm and elbow in a more desirable position at the start of their swing. Throughout the swing the location of the golfer's hips and arms is vital to producing a steady, consistent, accurate, and flush shot. The first band 104 crosses the golfer's 200 chest/stomach. The arm band 110 may be secured to various parts of the golfer's 200 arm based on the type of correction the golfer 200 is trying to make to their swing. In additional embodiments, the arm band 110 may be secured to the golfer's 200 left arm. Not shown is the belt connector 102 on the golfer's 200 left hip. The location on the arm of the golfer 200 and the location on the hip of the golfer 200 are all adjustable based on the type of correction the golfer 200 or their trainer is trying to accomplish. The depicted embodiment, is for a right-handed golfer 200 and can easily be modified to accommodate a left-handed golfer 200 simply by reversing the placement of the various components.

In this position, the golf training aid 100 shows the connection between the lower body (hips) and the upper body (arms and torso) of the golfer 200 interacting. This connection throughout the swing provides a more controlled and accurate shot. The arms and the hips of the golfer 200 are working in unison to product a sling shot effect that is more consistent and accurate then without to teach the golfer 200 the desired position of their arms and hips through their swing. Once the golfer 200 has used the golf training aid 100 to improve their posture and positioning throughout their swing, the golfer 200 is able to work on the speed of their swing to produce more power, while maintaining a high level of accuracy.

Figure 3:
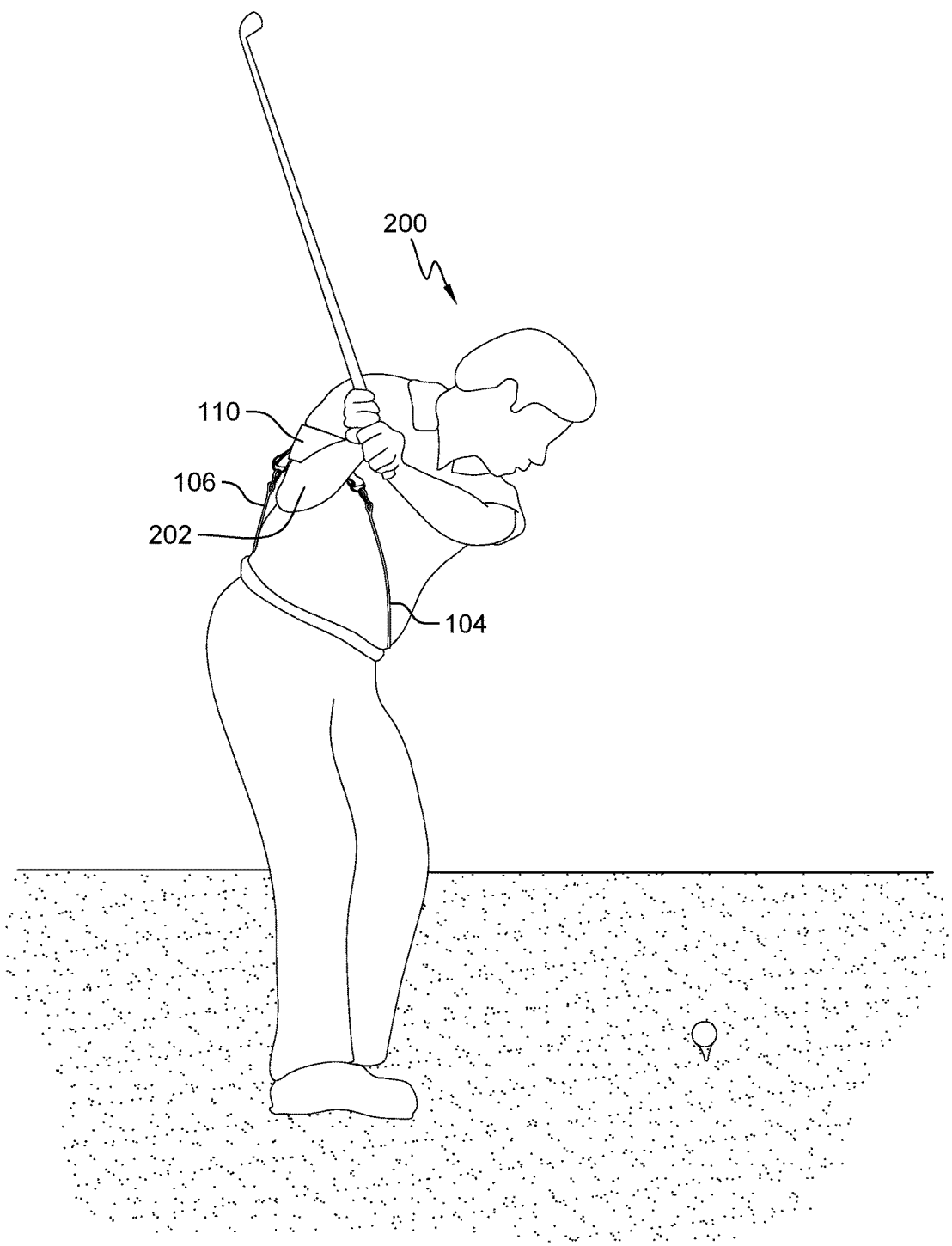
FIG. 3 depicts a front view of a golfer at the top of a back-swing wearing the golf training aid, in accordance with an embodiment of the present invention.

FIG. 3 depicts a rear view of a golfer 200 at the top of his back swing wearing the golf training aid 100 in accordance with an embodiment of the present invention. At the top of the back swing the golf training aid 100 holds the right elbow 200 of the golfer 200 in place and near the golfer's 200 torso, thereby reducing the opportunity for the golfer 200 to allow their right elbow 202 to "fly away" from the body. This is achieved due to the bands 104 and 106 producing tension forces thereby keeping the golfer's 200 right elbow 202 and arm closer to their torso. The golf training aid 100 forces the golfer's 200 right elbow 202 to remain in the ideal location through the back swing, allowing the golfer 200 to concentrate on other factors in their swing such as ensuring their head remains stationary and the weight is rotated around their torso in the direction of the back-swing. This also assists the golfer 200 in knowing what the proper position feels like, so when they remove the golf training aid 100, they can imitate the proper swing posture and position. An additional factor the golf training aid 100 assists with is keeping the right of the golfer 200 (or left in some cases) from straightening their arm to early in the downswing. This straightening of the arm leads to a loss of distance which can be easily avoided. The golf training aid 100 assists with adjusting all of these factors to improve the likelihood the golfer's 200 strikes the ball at the desired time in their swing.

Figure 4:
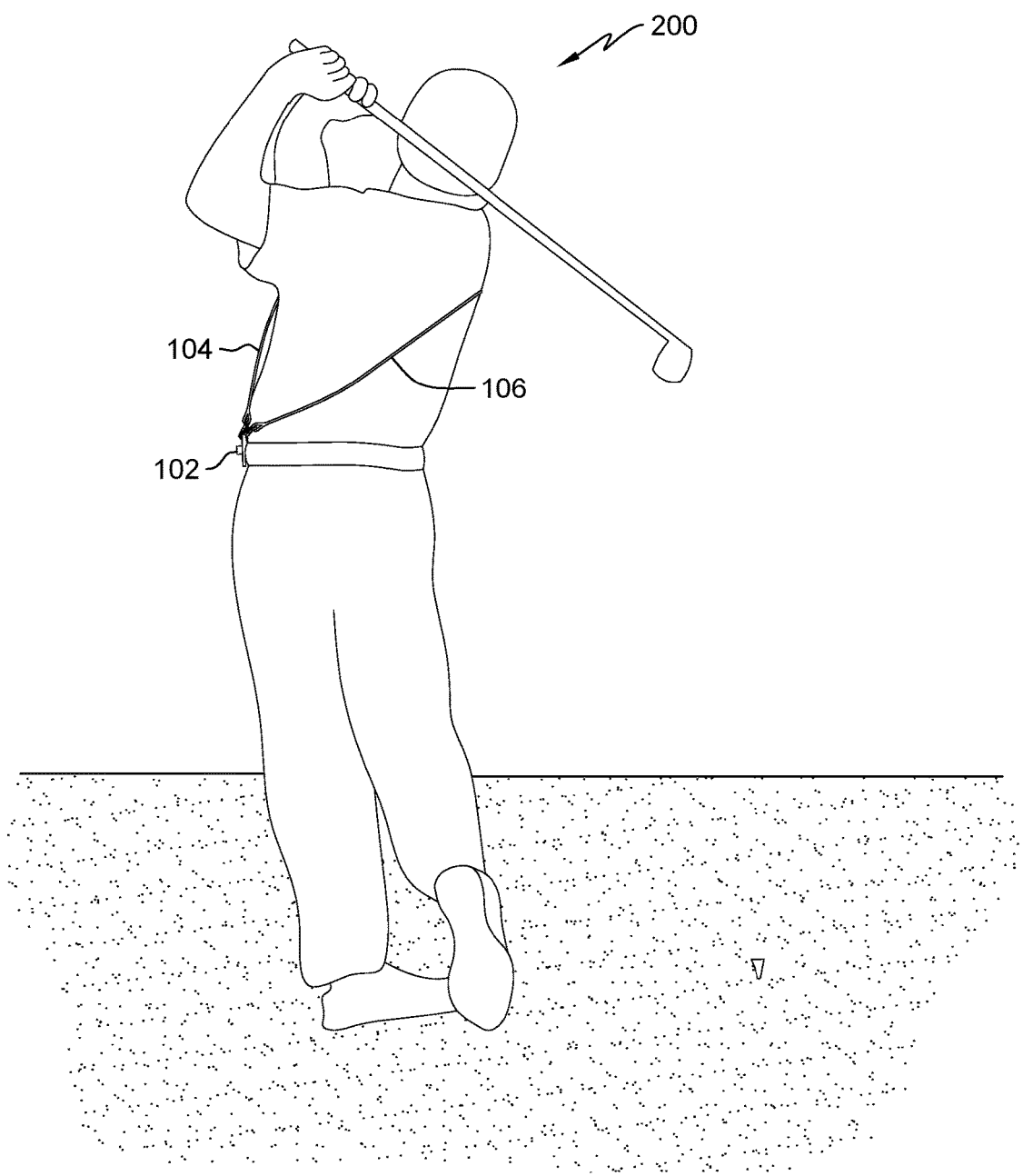
FIG. 4 depicts a front view of a golfer in the down-swing stage wearing the golf training aid in accordance with an embodiment of the present invention.

FIG. 4, depicts a rear view of the golfer 200 in the follow through stage of their swing, in accordance with one embodiment of the present invention. As the golfer 200 continues through their back swing the tension in band 104 decreases and the tension in band 106 increases through the point of contact with the ball. The shifting of the tension in the bands 104 and/or 106 creates a pulling force throughout the swing that is not present without the golf training aid 100 and assists the golfer 200 with following through their shot correctly and fluidly. This pulling force can help correct many of the typical problems in the swing through various means as described below, and these may include problems backswing, timing, lag, follow through swing, kinematic sequence and strength. Increased tension may serve as a reminder during the golf swing to maintain wrist hinge to increase lag. As the golfer 200 practices with the training aid, this motion becomes second nature and becomes easily incorporated into golf swings made without the golf training aid 100. The golf training aid 100 is not limited to the benefits mentioned herein. They just serve as examples of some of the benefits.

As the golfer 200 rotates into the down-swing, the left arm is brought forwardly and downwardly. Likewise, the weight of the golfer 200 is transferred by hip rotation to the left leg in order to generate power in the stroke. Arm band 110 encourages the right elbow of the golfer 200 to remain tucked relatively close to the torso of the golfer 200, thereby preventing flying elbow during the down-swing. During the follow-through, bands 104 and 106 are still function through their elasticity to encourage the golfer 200 to maintain compact, tight control over the swing. This prevents an exaggerated erratic follow-through, which is to be discouraged, notwithstanding that the ball is already in flight. In some instances, the right elbow is slightly bent at the point of impact, and this device assists in forcing the golfer 200 to keep their right elbow slightly bent instead of straightening out to soon on the downswing.

It is important during the down-swing for the golfer 200 to "drive" his or her hips through the swing. The power in a golf swing is generated by the legs and hips of the golfer 200, rather than by arm action alone. Bands 104 and 106, by being secured to the left hip area of the golfer 200, is relieved in tension somewhat as the left arm of the golfer 200 proceeds downwardly and forwardly during the downswing. This relief in tension encourages the golfer 200 to move his left hip forward and into the golf swing during the down-swing process.

As can be seen in the sequence depicted in the figures, the connector 102, bands 104 and 106, and the arm band 110 encourages the right-swinging golfer 200 to keep the right elbow close to the torso, and forces the stiff left arm to make a proper tight controlled arc as the golfer 200 rotates his body during the back-swing.

In some embodiments, as the golfer 200 perfects the posture of their swing, and the golf training aid 100 has an adjustable resistance device integrated into the design of the aid, the golfer 200 can slowly and methodically reduce the resistance to work on weening oneself off the need of the golf training aid 100.

The golf training aid 100 is only one specific version of the invention. The golf training aid 100 can be modified as required to accommodate various situations and objectives. One modification would be to substitute an adjustable band.

The golf training aid 100 is explained to in regard to a right-handed golfer. The device can be used for both a right handed or left-handed golfer and can be attached to a golfer's left or right arm, and their opposite hip to assist in helping correct various different issues or problems related to the golfer's swing. For example, a right-handed golfer can wear the golf training aid 100 from their left hip to their right for arm, the right elbow, or the right bicep. This allows the golfer 200 train their right arm motions in the backswing and downswing. In another example, the golf training aid 100 can be worn on the golfer's 200 right hip to left for arm, elbow, or bicep. This setup works in keeping connection between the upper body and arms during the backswing, especially keeping the left arm straight throughout the golf swing. Wearing the golf training aid 100 in this setup will train more of the follow through and extension portions of the swing.

Figure 5:
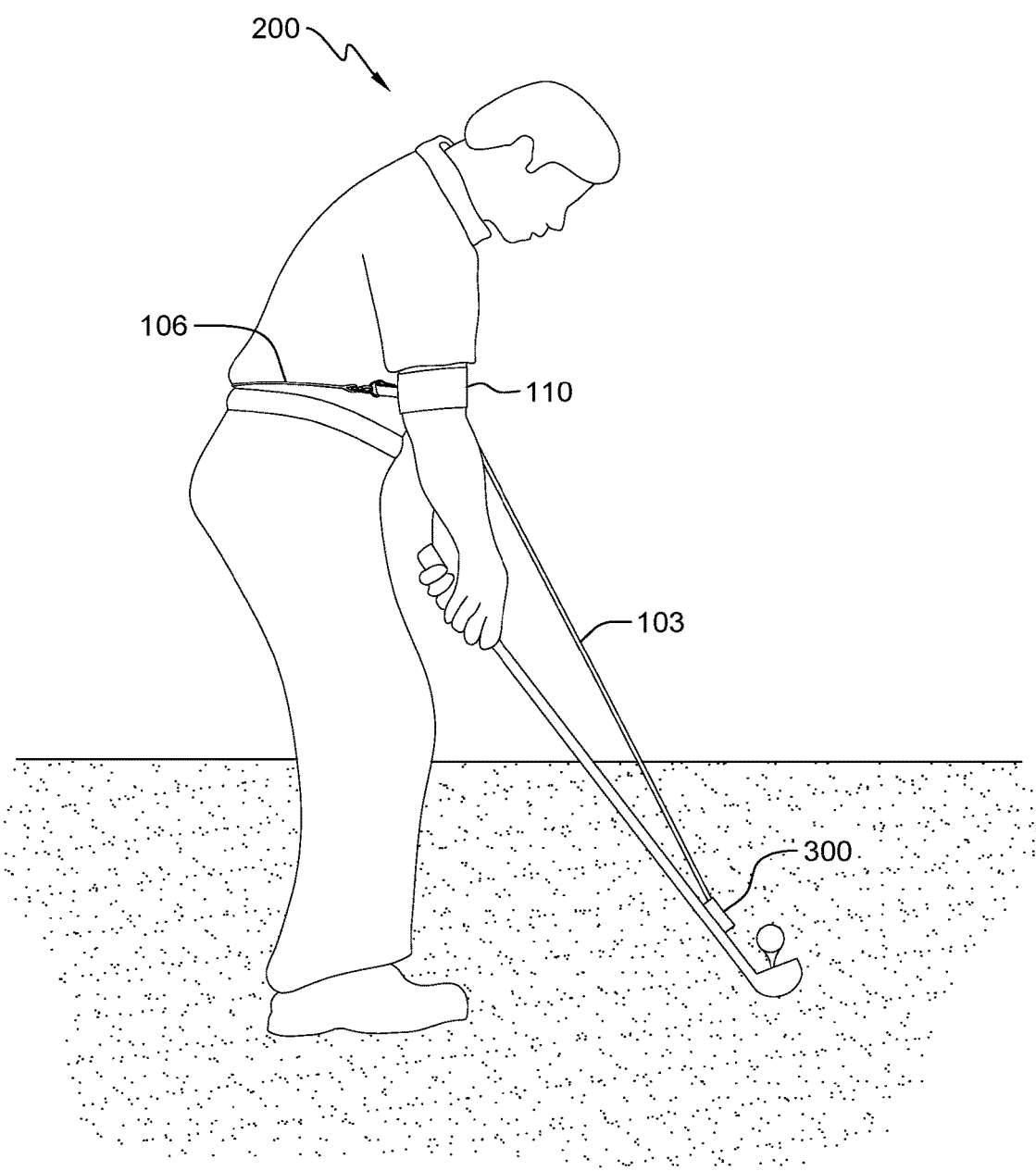
FIG. 5 depicts a front view of a golfer wearing the golf training aid with an attachment, in accordance with an embodiment of the present invention.

FIG. 5 depicts a front view of a golfer 200 wearing the golf training aid 100 with an attachment 300, in accordance with an embodiment of the present invention. In the depicted embodiment, the arm band 110 is shown attached to the golfer's 200 right arm above the elbow, and the second band 106 is shown extending around the back of the golfer 200, and a band 103 is attached to a clip 300 that is secured to the golf club. The first band 104 crosses the golfer's 200 chest/stomach. The arm band 110 may be secured to various parts of the golfer's 200 arm based on the type of correction the golfer 200 is trying to make to their swing. The attachment 300 is secured to the golf club by various mechanism or adhesives, and adds an additional feature to further correct the golfer's 200 swing. The positions of the attachment 300 and the length and material of the band 103 is adjustable to assist with correcting club rotation, club positioning, and correcting the golfer's 200 hand throughout their swing.

The invention is inclusive of combinations of the embodiments or embodiments described herein. References to "a particular embodiment" or "embodiment" and the like refer to features that are present in at least one embodiment of the invention. Separate references to "an embodiment" or "particular embodiments" or "embodiments" or the like do not necessarily refer to the same embodiment or embodiments; however, such embodiments are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention. The present invention shall be easily carried out by an ordinary skilled person in the art, and any modifications and changes are deemed to be within the scope of the present invention.

This written description uses examples to disclose the invention, including the best mode, and also to enable any person skilled in the art to practice embodiments of the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

What is claimed is:

1. A golf training aid comprising:
    an adjustable upper arm band adapted to releasably fasten;
    a linear flexible strip having a first closed end and a second closed end, wherein the flexible strip is attached to the adjustable upper arm band at substantially a midpoint between the first end and the second end;
    a first band of a first predetermined length, having a first closed end and a second closed end;
    a second band of a second predetermined length, having a first closed end and a second closed end
    a plurality of connector secured to the first closed end, the second closed end of the first band and the first closed end, and the second closed end of the second band, wherein the connectors secured to the first closed end of the first band and the first closed end of the second band are detachably connected to the first closed end and the second closed end of the linear flexible strip a belt clip, wherein the connector secured to the second closed end of the first band and a connector secured to the second closed end of the second band are connected to the belt clip.

2. The golf training aid of claim 1, wherein the first band and the second band are made from an elastically expandable material.

3. The golf training aid of claim 1, further comprising an adjustable length mechanism integrated into the first band and the second band, wherein the overall length of the first band and the second band are adjustable.

4. The golf training aid of claim 1, wherein the predetermined length of the first band and the second band are substantially equal in length.

5. The golf training aid of claim 1, further comprising a third band having a first end and a second end and the first end is attached to the linear flexible strip at the first closed end.

6. The golf training aid of claim 5, further comprising a shaft attachment, wherein the second end of the third band is attached to the shaft attachment and the shaft attachment is secured to a predetermined location on a golf club.

7. The golf training aid of claim 1, wherein the linear flexible strip is made from an elastically expandable material.

8. The golf training aid of claim 1, wherein the adjustable arm band is four inches wide.

9. The golf training aid of claim 8, wherein the linear flexible strip is the substantially the same width as the adjustable armband.

10. The golf training aid of claim 1, wherein the adjustable upper arm band has a first surface, and the linear flexible strip is attached to the first surface of the adjustable upper arm band.

11. A golf training aid comprising:
an adjustable arm band adapted to releasably fasten;
a linear flexible strip having a first closed end and a second closed end, wherein the linear flexible strip is secured to the adjustable arm band at substantially a midpoint between the first closed end and the second closed end;

a first band assembly, comprising;
  a first band having a first end and a second end,
  a set of clips attached to the first end and the second end of the first band, wherein the clip attached to the first end is detachably connected to the first closed end of the linear flexible strip, and
  a length adjustment mechanism secured to the first band;

a second band assembly, comprising;
  a second band having a first end and a second end,
  a set of clips attached to the first end and the second end of the second band, wherein the clip attached to the first end is detachably connected to the second closed end of the linear flexible strip, and
  a length adjustment mechanism secured to the second band;

a shaft connector assembly, comprising;
  a third band having a first end and a second end,
  a clip attached to the first end of the third band, wherein the clip is detachably connected to the first closed loop of the linear flexible strip, and
  a shaft connector, wherein the shaft connector is secured to a predetermined location of a shaft and the second end of the third band is secured to the shaft connector; and a belt clip, wherein the clips connected to the second end of the first band and the second end of the second band are detachably connected to the belt clip.

12. The golf training aid of claim 11, further comprising;
a length adjustment mechanism integrated with the third band.

13. The golf training aid of claim 11, wherein the first band and the second band are substantially equal in length.

* * * * *